United States Patent
Okada et al.

(10) Patent No.: US 9,807,328 B2
(45) Date of Patent: Oct. 31, 2017

(54) IMAGE SENSOR, OPERATION METHOD OF IMAGE SENSOR, IMAGING DEVICE, IMAGING METHOD, AND ELECTRONIC APPARATUS

(71) Applicant: Sony Corporation, Tokyo (JP)

(72) Inventors: Chihiro Okada, Tokyo (JP); Nobutaka Shimamura, Kanagawa (JP); Atsushi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 81 days.

(21) Appl. No.: 14/667,059

(22) Filed: Mar. 24, 2015

(65) Prior Publication Data
US 2015/0281623 A1 Oct. 1, 2015

(30) Foreign Application Priority Data
Mar. 31, 2014 (JP) ................. 2014-073876

(51) Int. Cl.
*H04N 9/64* (2006.01)
*H04N 5/3745* (2011.01)
*H04N 5/378* (2011.01)
*H04N 9/04* (2006.01)
*H04N 5/365* (2011.01)
*H04N 5/262* (2006.01)

(52) U.S. Cl.
CPC ....... *H04N 5/37455* (2013.01); *H04N 5/3658* (2013.01); *H04N 5/378* (2013.01); *H04N 9/045* (2013.01)

(58) Field of Classification Search
CPC .. H04N 5/37455; H04N 5/3658; H04N 9/045; H04N 5/378
See application file for complete search history.

(56) References Cited

U.S. PATENT DOCUMENTS

2013/0176154 A1* 7/2013 Bonaccio ............. H03M 1/182
341/118
2015/0163424 A1* 6/2015 Morino .................. H04N 5/374
348/243

FOREIGN PATENT DOCUMENTS

WO 0057634 A1 9/2000

* cited by examiner

*Primary Examiner* — Twyler Haskins
*Assistant Examiner* — Carramah J Quiett
(74) *Attorney, Agent, or Firm* — Sheridan Ross P.C.

(57) ABSTRACT

Provided is an image sensor having a column ADC configuration including, for every pixel row, an analog digital converter (ADC) that converts a pixel signal including an analog signal generated by photoelectric conversion into an output signal including a digital signal. The image sensor includes a plurality of clamp operation units each configured to calculate a reference level based on each output signal of a plurality of ADC groups, and a reference voltage output unit configured to convert a digital signal of the reference level calculated by the clamp operation unit into a reference voltage including an analog signal, and supply the reference voltage to each the ADC that constitutes the ADC group.

10 Claims, 9 Drawing Sheets

IMAGE SENSOR, OPERATION METHOD OF IMAGE SENSOR, IMAGING DEVICE, IMAGING METHOD, AND ELECTRONIC APPARATUS

CROSS REFERENCE TO RELATED APPLICATIONS

This application claims the benefit of Japanese Priority Patent Application JP 2014-073876 filed Mar. 31, 2014, the entire contents of which are incorporated herein by reference.

BACKGROUND

The present technology relates to an image sensor, and an operation method of the image sensor, an imaging device and an imaging method, and an electronic apparatus, and in particular, in an image sensor having a column analog digital converter (ADC) configuration, the present technology relates to an image sensor, and an operation method of the image sensor, an imaging device and an imaging method, and an electronic apparatus, which make it possible to correct a characteristic difference between ADC groups in a case where a plurality of ADC groups exists.

In an image sensor having a column ADC configuration including two ADC groups, there has been a case where an parasitic capacitance of each of the ADC groups changes due to a layout or the like in the image sensor, and characteristics of each of the ADC groups have changed, and a difference (characteristic difference) of characteristics is generated between the ADC groups.

When a pixel signal including an analog signal is converted into a digital signal by using a plurality of ADC groups having different characteristics as described above, even if the same analog signal is converted into a digital signal, the analog signal will be converted into a different digital signal. Therefore, when a pixel signal including an analog signal is converted into a digital signal, color will not be developed with a suitable color, and as a result, there is fear that suitable color developing is not achieved.

Then, a technology to correct characteristics of an ADC group and convert appropriately an analog signal into a digital signal has been proposed (refer to WO 2000057634A, for example).

SUMMARY

Meanwhile, in the technology of WO 2000057634A, although the technology is effective in a case of two ADC groups, there is fear that sufficient correction is not carried out in a case of four or eight ADC groups.

The present technology has been made in view of such a situation, and in particular, even in a case where more than two ADC groups are used, the technology realizes suitable digital-to-analog conversion by correcting a characteristic difference between the ADC groups.

An image sensor according to an embodiment of the present technology has a column ADC configuration including, for every pixel row, an analog digital converter (ADC) that converts a pixel signal including an analog signal generated by photoelectric conversion into an output signal including a digital signal. The image sensor includes a plurality of clamp operation units each configured to calculate a reference level based on each output signal of a plurality of ADC groups, and a reference voltage output unit configured to convert a digital signal of the reference level calculated by the clamp operation unit into a reference voltage including an analog signal, and supply the reference voltage to each the ADC that constitutes the ADC group.

The clamp operation unit may calculate the reference level when each output signal of the plurality of ADC groups is an output signal of a light-shielding pixel, and the reference voltage output unit may convert a digital signal of a reference level calculated by the clamp operation unit into a reference voltage including an analog signal, and supply the reference voltage to each the ADC that constitutes the ADC group.

The clamp operation unit may calculate as an offset a difference between each output signal of the plurality of the ADC groups and an output signal which should be the reference level, and calculate a reference level in accordance with the offset.

The image sensor may further include a characteristic difference measurement storage unit configured to measure and store a difference of an output signal for each of the plurality of ADC groups as a characteristic difference. The reference voltage output unit may output a reference voltage to the ADC with a gain for correcting the characteristic difference that is stored by the characteristic difference measurement storage unit.

The characteristic difference measurement storage unit may measure as a characteristic difference a difference in an output signal between the plurality of ADC groups at the time of supplying the reference voltage to all of the ADC groups with a prescribed gain.

An operation method of an image sensor according to an embodiment of the present technology, the image sensor having a column ADC configuration including, for every pixel row, an analog digital converter (ADC) that converts a pixel signal including an analog signal generated by photoelectric conversion into an output signal including a digital signal, includes calculating a reference level based on each output signal of a plurality of ADC groups, and converting a digital signal of the calculated reference level into a reference voltage including an analog signal, and supplying the reference voltage to each the ADC that constitutes the ADC group.

An imaging device according to an embodiment of the present technology includes an image sensor having a column ADC configuration including, for every pixel row, an analog digital converter (ADC) that converts a pixel signal including an analog signal generated by photoelectric conversion into an output signal including a digital signal. The imaging device including a plurality of clamp operation units each configured to calculate a reference level based on each output signal of a plurality of ADC groups, and a reference voltage output unit configured to convert a digital signal of the reference level calculated by the clamp operation unit into a reference voltage including an analog signal, and supplies the reference voltage to each the ADC that constitutes the ADC group.

An imaging method according to an embodiment of the present technology is an imaging method of an imaging device that includes an image sensor having a column ADC configuration including, for every pixel row, an analog digital converter (ADC) that converts a pixel signal including an analog signal generated by photoelectric conversion into an output signal including a digital signal. The imaging method includes calculating a reference level based on each output signal of a plurality of ADC groups, and converting a digital signal of the calculated reference level into a reference voltage including an analog signal, and supplying the reference voltage to each the ADC that constitutes the ADC group.

An electronic apparatus according to an embodiment of the present technology includes an image sensor having a column ADC configuration including, for every pixel row, an analog digital converter (ADC) that converts a pixel signal including an analog signal generated by photoelectric conversion into an output signal including a digital signal. The electronic apparatus includes a plurality of clamp operation units each configured to calculate a reference level based on each output signal of a plurality of ADC groups, and a reference voltage output unit configured to convert a digital signal of the reference level calculated by the clamp operation unit into a reference voltage including an analog signal, and supplies the reference voltage to each the ADC that constitutes the ADC group.

In an embodiment of the present technology, in an image sensor having a column ADC configuration including, for every pixel row, an analog digital converter (ADC) that converts a pixel signal including an analog signal generated by photoelectric conversion into an output signal including a digital signal, or in an image sensor, and an imaging device and an electronic apparatus including the image sensor, a reference level is calculated by a plurality of clamp operation units based on each output signal of the plurality of the ADC groups, and a digital signal of the calculated reference level is converted into a reference voltage including an analog signal to be supplied to each the ADC that constitutes the ADC group.

According to an embodiment of the present technology, it becomes possible to correct a characteristic difference between ADC groups in an image sensor which is configured by a plurality of column ADCs

DETAILED DESCRIPTION OF THE EMBODIMENT(S)

Figure 1:
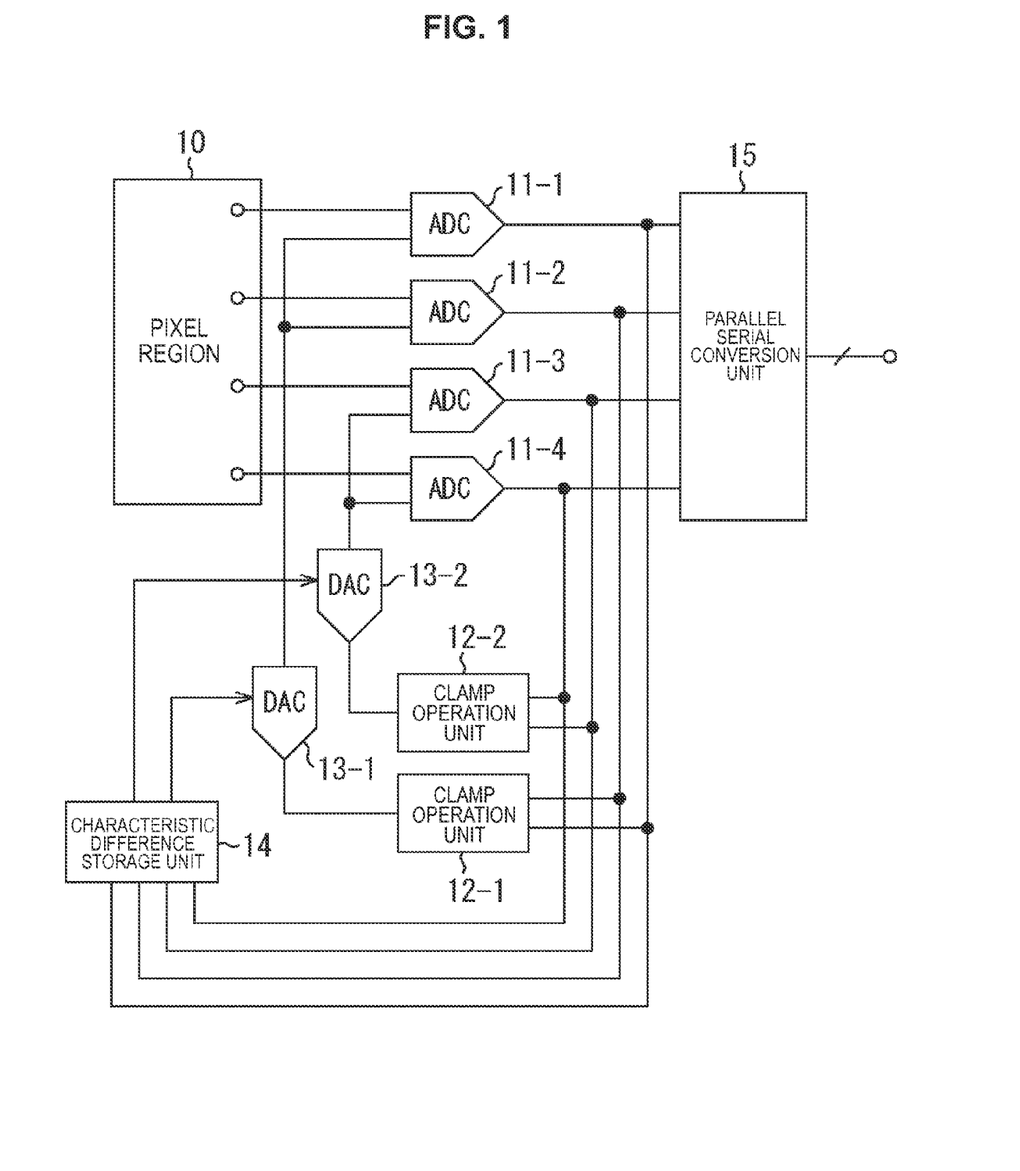
FIG. 1 illustrates an electrical configuration illustrating a configuration example of a first embodiment of an image sensor to which the present technology is applied.
Figure 2:
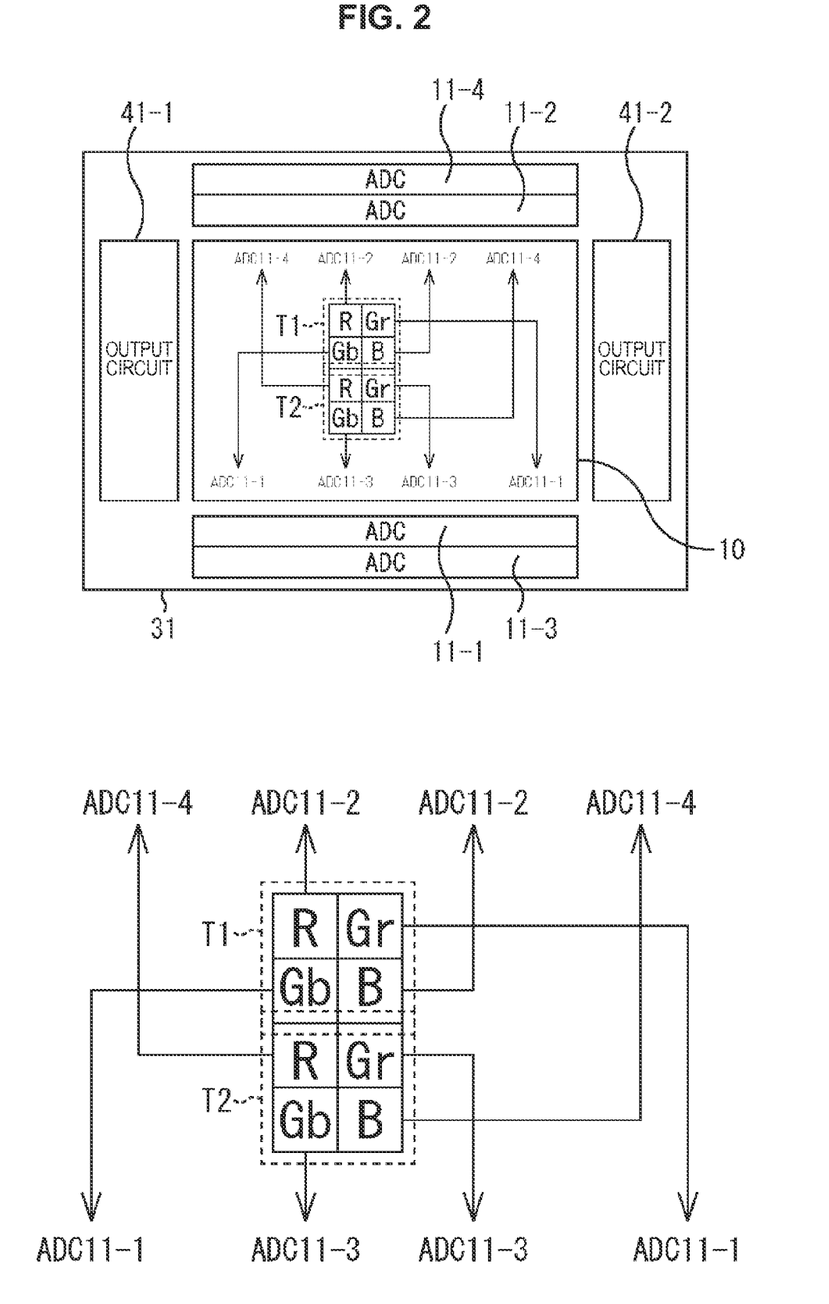
FIG. 2 is a figure explaining a pixel region of the image sensor and a layout of ADC of FIG. 1.

Note that description will be given in the following order.
1. First embodiment (configuration example in a case where four ADCs are used)
2. Modification example of first embodiment
3. Second embodiment (configuration example in a case where eight ADCs are used)
4. Modification example of second embodiment 1. First Embodiment Configuration Example in a Case where Four ADCs are Used FIG. 1 and FIG. 2 illustrate a configuration example of an embodiment of an image sensor to which the present technology is applied. In more detail, FIG. 1 illustrates an electrical configuration of the image sensor, and FIG. 2 illustrates a pixel region of the image sensor and layout example of an analog digital converter (ADC).

The image sensor of FIG. 1 converts into a digital signal a pixel signal including an analog signal generated by a photodiode constituting each pixel arranged on the pixel region by photoelectric conversion in accordance with a quantity of incident light and outputs the digital signal, and generates an image by the output pixel signal. This image sensor is, for example, used for an imaging device such as a still camera and a video camera, and is used also for an electronic apparatus such as a portable terminal represented by a smart phone etc.

More specifically, the image sensor of FIG. 1 and FIG. 2 includes a pixel region 10, ADCs 11-1 to 11-4, clamp operation units 12-1 and 12-2, digital analog converters (DACs) 13-1 and 13-2, a characteristic difference storage unit 14, a parallel serial conversion unit 15, and output circuits 41-1 and 41-2. Note that, in the upper part of FIG. 2, an example of a layout in a case where the pixel region 10 and ADCs 11-1 to 11-4 are provided on the same wafer 31 is illustrated. In addition, in the lower part of FIG. 2, it is illustrated to which of ADCs 11-1 to 11-4 pixel signals each including an analog signal of each pixel in a first pixel group T1 and second pixel group T2 in the pixel region 10 in the upper part of FIG. 2 are supplied. That is, enlarged description in the pixel region 10 in the upper part of FIG. 2 is illustrated in the lower part of FIG. 2.

In addition, the ADCs 11-1 to 11-4, clamp operation units 12-1 and 12-2, and DACs 13-1 and 13-2, when distinction is not necessary in particular, are referred to merely as an ADC 11, a clamp operation unit 12, and a DAC 13, and the other components are also referred to similarly.

The analog digital converters (ADCs) 11-1 to 11-4 are arranged in a region vertically adjacent to the pixel region 10 in FIG. 2. In more detail, ADCs 11-1 and 11-3 are arranged in regions below and adjacent to the pixel region 10 in FIG. 2 in this order from a region closer to the pixel region 10, and ADCs 11-2 and 11-4 are arranged in regions above and adjacent to the pixel region 10 in this order from a region closer to the pixel region 10. Each of ADCs 11-1 to 11-4 converts a pixel signal including an analog signal sequentially transferred from a plurality of pixels including photodiodes provided in the pixel region 10 into a digital signal in a quantization unit in accordance with a reference voltage and a resolution. ADCs 11-1 to 11-4 output as a parallel signal the pixel signal converted into a digital signal to the clamp operation units 12-1 and 12-2, the characteristic difference storage unit 14, and the parallel serial conversion unit 15.

In more detail, in the pixel region 10 as illustrated in FIG. 2, the first pixel group T1 and second pixel group T2 each in the unit of four pixels including an R (red) pixel, Gr and Gb (green) pixels, and B (blue) pixel in a Bayer array are repeatedly arranged adjacently in the vertical direction. Among these, a pixel signal including an analog signal of a Gr pixel and Gb pixel of the first pixel group T1 and a pixel signal including an analog signal of an R pixel and B pixel of the first pixel group T1 are supplied to ADC 11-1 and ADC 11-2, respectively. In addition, a pixel signal including an analog signal of a Gr pixel and Gb pixel of the second pixel group T2 and a pixel signal including an analog signal of an R pixel and B pixel of the second pixel group T2 are supplied to ADC 11-3 and ADC 11-4, respectively. Note that, in a Bayer array of a total of 4 pixels of 2 pixels×2 pixels in each of the first pixel group T1 and the second pixel group T2, an R (red) pixel is arranged in the upper left, a Gr (green) pixel is arranged in the upper right, a Gb (green) is arranged in the lower left, and a B (blue) pixel is arranged in the lower right. Note that, the Bayer array is merely one example, and a pixel arrangement may be one other than this. Each pixel signal is processed in a time-division manner to be sequentially transferred to ADCs 11-1 to 11-4, respectively.

The parallel serial conversion unit 15 converts the pixel signal converted into a digital signal, which is supplied in parallel from ADCs 11-1 to 11-4, into a serial signal, and outputs the serial signal from output circuits 41-1 and 41-2 each including a not-illustrated electrode portion (PAD) provided in a region adjacent to the pixel region 10 in the horizontal direction in FIG. 2.

The clamp operation units 12-1 and 12-2 calculate reference levels, respectively, based on pixel signals of pixels in a not-illustrated light shielding region provided in a peripheral portion, etc. of the pixel region 10, the pixel signals being converted into digital signals by ADCs 11-1 to 11-4. Then, the clamp operation units 12-1 and 12-2 output any of the average values, minimum values and maximum values of the reference levels to DACs 13-1 and 13-2 as correction levels, respectively. Each of the clamp operation units 12-1 and 12-2 repeats the same processing in real time, and outputs a correction level repeatedly.

DACs 13-1 and 13-2 convert signals of correction levels supplied from the clamp operation units 12-1 and 12-2 from digital signals into analog signals, respectively, and supply the analog signals to ADCs 11-1 and 11-2 and ADCs 11-3 and 11-4 as reference voltages (reference), respectively. At this time, DACs 13-1 and 13-2 output the reference voltages (reference), respectively, in a state where a gain is controlled so that a mutual characteristic difference may be corrected by the characteristic difference storage unit 14.

The characteristic difference storage unit 14, when a power source of the image sensor is turned off, makes all the pixels of the pixel region 10 imaged as light-shielding pixels, and stores a difference thereof as a characteristic difference based on pixel signals converted into digital signals by ADCs 11-1 to 11-4. In more detail, the characteristic difference storage unit 14 calculates an output difference between ADC 11-1 or 11-2 and ADC 11-3 or 11-4 as a characteristic difference between an ADC group including ADCs 11-1 and 11-2 and an ADC group including ADCs 11-3 and 11-4, and stores the characteristic difference. Then, the characteristic difference storage unit 14 controls gains of DACs 13-1 and 13-2 so as to cancel the stored characteristic difference.

The clamp operation unit 12-1 calculates and outputs a correction level which controls each reference voltage (reference) of a first ADC group including ADC 11-1 which outputs a Gr pixel and Gb (green) pixel of the first pixel group T1, and ADC 11-2 which outputs an R (red) pixel and B (blue) pixel of the first pixel group T1.

Similarly, the clamp operation unit 12-2 calculates and outputs a correction level which controls each reference voltage (reference) of a second ADC group including ADC 11-3 which outputs a Gr pixel and Gb (green) pixel of the second pixel group T2 and ADC 11-4 which outputs an R (red) pixel and B (blue) pixel of the second pixel group T2.

Therefore, almost the same reference voltage (reference) will be supplied to ADCs 11-1 and 11-2. Thereby, a balance in color development of an R pixel, a Gb pixel, a Gr pixel and a B pixel in the first pixel group is regulated, and substantially, a white balance will be adjusted, and characteristics of ADCs 11-1 and 11-2 will be regulated. Similarly, almost the same reference voltage (reference) will be supplied to ADCs 11-3 and 11-4. Thereby, a balance in color development of an R pixel, a Gb pixel, a Gr pixel and a B pixel in the second pixel group is regulated, and substantially, a white balance will be adjusted, and characteristics of ADCs 11-3 and 11-4 are regulated.

However, ADCs 11-1 and 11-2 and ADCs 11-3 and 11-4 are not the same in a parasitic capacitance etc. since layouts thereof on the wafer 31 are different as illustrated in FIG. 2, and therefore, will have different characteristics from each other generally. Therefore, as for the first pixel group and the second pixel group, although color development is regulated between pixels in each region, a difference is generated in characteristics between the first ADC group including ADCs 11-1 and 11-2 and the second ADC group including ADCs 11-3 and 11-4. As a result, a difference will be generated slightly in color development between the first pixel group and the second pixel group, and there is fear that image quality degrades.

Then, the characteristic difference storage unit 14 captures a black image by making all the pixels be in a light-shielding state just before a power source is turned off, and also measures and stores an output difference between ADC 11-1 or 11-2 and ADC 11-3 or 11-4 as a characteristic difference by setting a gain of DACs 13-1 and 13-2 to the maximum at this time. This characteristic difference is a difference generated due to a characteristic difference between ADC groups between the first ADC group including ADCs 11-1 and 11-2 and the second ADC group including ADCs 11-3 and 11-4. The characteristic difference storage unit 14, after storing a characteristic difference by characteristic difference storage processing described later with reference to FIG. 4, adjusts a gain between DACs 13-1 and 13-2 so that this stored characteristic difference may be corrected in characteristic difference correction processing described later with reference to FIG. 3, and makes each of DACs 13-1 and 13-2 output a reference voltage (reference).

This corrects the characteristic difference between ADC groups, which makes it possible to realize high speed processing by a plurality of ADCs while suppressing a difference in color development generated between the first pixel group T1 and second pixel group T2 in the pixel region 10.

Note that, in the characteristic difference mentioned here, an offset component and a gain component are included. The offset component denotes a deviation of a reference level in digital signals output from ADCs 11-1 to 11-4 and adjusted by the clamp operation units 12-1 and 12-2. In addition, the gain component denotes a deviation of linearity with respect to the correction levels of ADCs 11-1 and 11-2 and ADCs 11-3 and 11-4 which are supplied from the clamp operation units 12-1 and 12-2, the deviation of linearity being adjusted by the clamp operation units 12-1 and 12-2.

<ADC Group Characteristic Difference Correction Processing>

Figure 3:
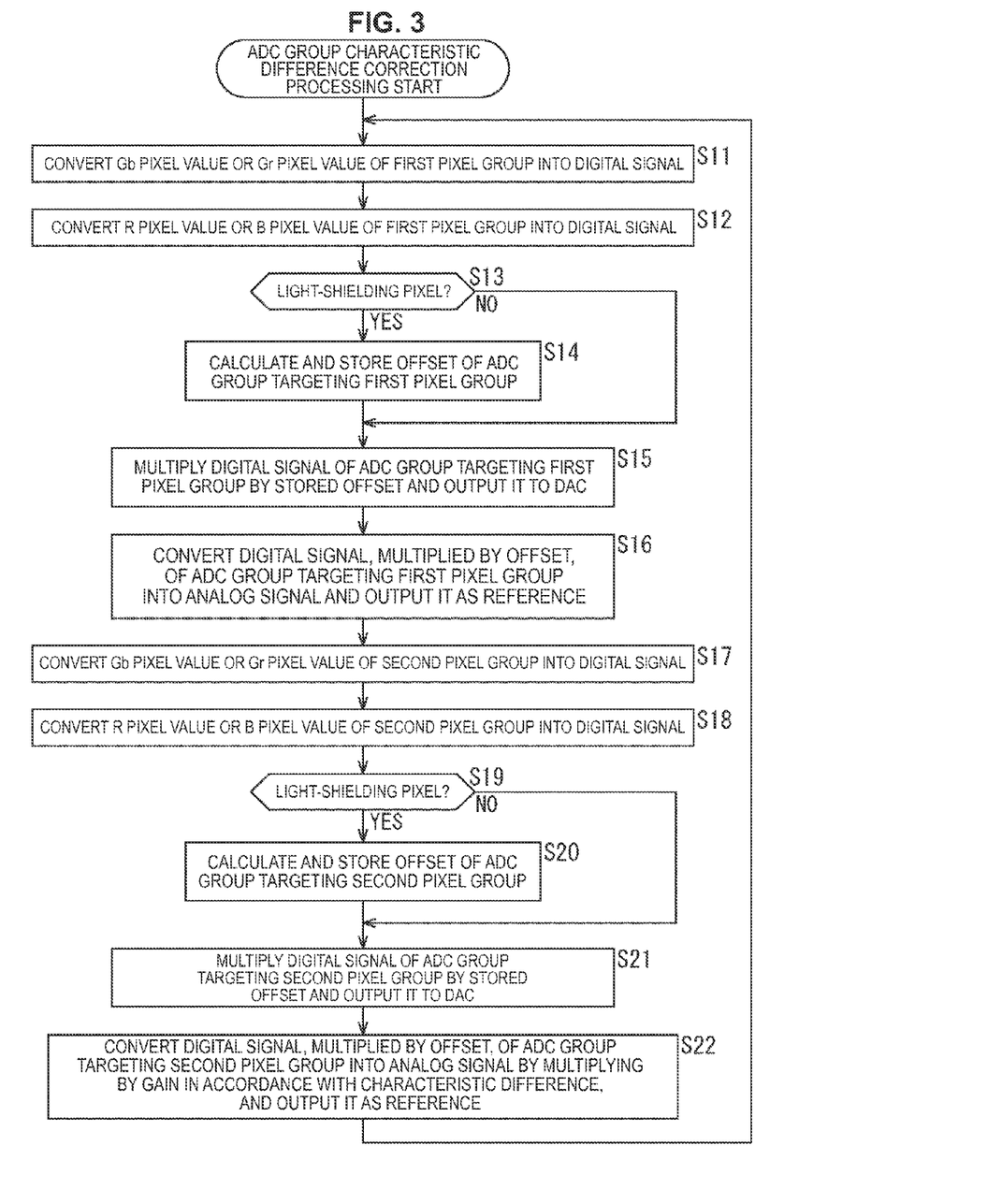
FIG. 3 is a flowchart explaining ADC group characteristic difference correction processing.

Next, with reference to a flowchart of FIG. 3, a characteristic difference correction processing between ADC groups by the image sensor of FIGS. 1 and 2 will be described. Note that, in this processing, it is assumed that a pixel signal including an analog signal generated sequentially by photoelectric conversion from a photodiode constituting a pixel in the pixel region 10 is supplied sequentially.

In Step S11, ADC 11-1 converts a pixel value (Gb pixel value) of the Gb pixel in the first pixel group, or a pixel value (Gr pixel value) of the Gr pixel of the first pixel group into a digital signal, and outputs it to the clamp operation unit 12, the characteristic difference storage unit 14 and the parallel serial conversion unit 15.

In Step S12, ADC 11-2 converts a pixel value (R pixel value) of the R pixel of the first pixel group, or a pixel value (B pixel value) of the B pixel of the first pixel group into a digital signal, and outputs it to the clamp operation unit 12, the characteristic difference storage unit 14 and the parallel serial conversion unit 15.

In Step S13, the clamp operation unit 12-1 determines whether or not the current pixel is a light-shielding pixel provided in the peripheral portion of the pixel region 10, and when the current pixel is a light-shielding pixel, the processing progresses to Step S14.

In Step S14, the clamp operation unit 12-1 calculates and stores an offset based on a reference level, by a pixel signal including a digital signal output from ADCs 11-1 and 11-2 which is the first ADC group targeting the first pixel group. That is, a pixel value supplied from a light-shielding pixel, although it should be supplied as a signal of a reference level, may be a pixel value deviated from the reference level due to characteristics of ADCs 11-1 and 11-2. Then, the clamp operation unit 12-1 calculates this deviation amount as an offset, and stores this offset with respect to a plurality of pixels.

In Step S15, the clamp operation unit 12-1 sets a correction level by multiplying pixel signals of ADCs 11-1 and 11-2 by the average value, minimum value, or maximum value of the stored offsets of the plurality of pixels, and outputs it to DAC 13-1. That is, the clamp operation unit 12-1, so that a pixel value of a light-shielding pixel may be a reference level, sets a correction level so that a reference voltage (reference) from DAC 13-1 may be deviated by an amount of the stored offset, and outputs it to DAC 13-1. Note that, in Step S13, when it is considered that the current pixel is not a light-shielding pixel, processing of Step S14 is skipped.

In Step S16, DAC 13-1 converts a digital signal of a correction level supplied from the clamp operation unit 12-1 into an analog signal, and outputs it as a reference voltage (reference) to ADCs 11-1 and 11-2 which are the first ADC group targeting the first pixel group.

In Step S17, ADC 11-3 converts a pixel value (Gb pixel value) of the Gb pixel of the second pixel group, or a pixel value (Gr pixel value) of the Gr pixel of the second pixel group into a digital signal, and outputs it to the clamp operation unit 12, the characteristic difference storage unit 14 and the parallel serial conversion unit 15.

In Step S18, ADC 11-4 converts a pixel value (R pixel value) of the R pixel of the second pixel group or a pixel value (B pixel value) of the B pixel of the second pixel group into a digital signal, and outputs it to the clamp operation unit 12, the characteristic difference storage unit 14 and the parallel serial conversion unit 15.

In Step S19, the clamp operation unit 12-2 determines whether or not the current pixel is a light-shielding pixel provided in the peripheral portion of the pixel region 10, and when the current pixel is a light-shielding pixel, processing progresses to Step S20.

In Step S20, the clamp operation unit 12-2 calculates an offset based on a reference level and stores it with respect to a plurality of pixels, by a pixel signal including a digital signal output from ADCs 11-3 and 11-4 which are the ADC group targeting the second pixel group.

In Step S21, the clamp operation unit 12-2 sets a correction level by multiplying pixel signals of ADCs 11-3 and 11-4 by the average value, minimum value, or maximum value of the stored offsets of the plurality of pixels, and outputs it to DAC 13-2. Note that, in Step S19, when it is considered that the current pixel is not a light-shielding pixel, processing of Step S20 is skipped.

In Step S22, DAC 13-2, converts a digital signal of a correction level supplied from the clamp operation unit 12-2 into an analog signal, and outputs it as a reference voltage (reference) to ADCs 11-3 and 11-4 which are the second ADC group targeting the second pixel group. At this time, DAC 13-2 multiplies a gain in accordance with a characteristic difference (gain component) stored in the characteristic difference storage unit 14 to output a reference voltage (reference).

By the above processing, when a pixel signal outside a light shielding region is supplied, a gain of DAC 13-2 is adjusted based on the characteristic differences of ADCs 11-3 and 11-4 with respect to ADCs 11-1 and 11-2, the characteristic differences being stored in the characteristic difference storage unit 14, and a reference voltage is output, and thereby, a reference voltage (reference) is supplied to ADCs 11-3 and 11-4 so that the gain component of characteristic differences between the first ADC group including ADCs 11-1 and 11-2 and the second ADC group including ADCs 11-3 and 11-4 may be absorbed. At this time, since a correction level set based on an offset is supplied to DACs 13-1 and 13-2, an offset component in the characteristic differences is also corrected. That is, an offset component of the characteristic differences is corrected independently from each other in the first pixel group T1 and the second pixel group T2 by each of the clamp operation units 12-1 and 12-2. In addition, a gain component of the characteristic differences is corrected relatively based on a characteristic difference calculated as an output difference between the first pixel group T1 and the second pixel group T2 by the characteristic difference storage unit 14.

As a result, it becomes possible to realize appropriate color development by operating so that a characteristic difference between different ADC groups may be absorbed, which makes it possible to achieve high image quality. In addition, since it becomes possible to correct a characteristic difference (offset component in particular) dynamically, it becomes possible to maintain appropriate color development in the long term, which makes it possible to secure an image quality over a long period of time. In addition, since a characteristic difference between ADC groups responds to a change of a parasitic capacitance due to a layout, in a layout of an ADC group, symmetry is made to be fundamental, and the layout has been adjusted by the other know-how or a trial and error, hitherto, and however, since the layout can be made not to be influenced by a parasitic capacitance, it becomes possible to enhance flexibility of the ADC layout. Note that processing of storing a characteristic difference will be described later with reference to FIG. 4.

In addition, when a pixel signal of a light shielding region is supplied, an offset component which is a characteristic difference of ADCs 11-1 to 11-4 is calculated and adjusted, and a reference voltage (reference) is corrected dynamically.

<Characteristic Difference Storage Processing>

Figure 4:
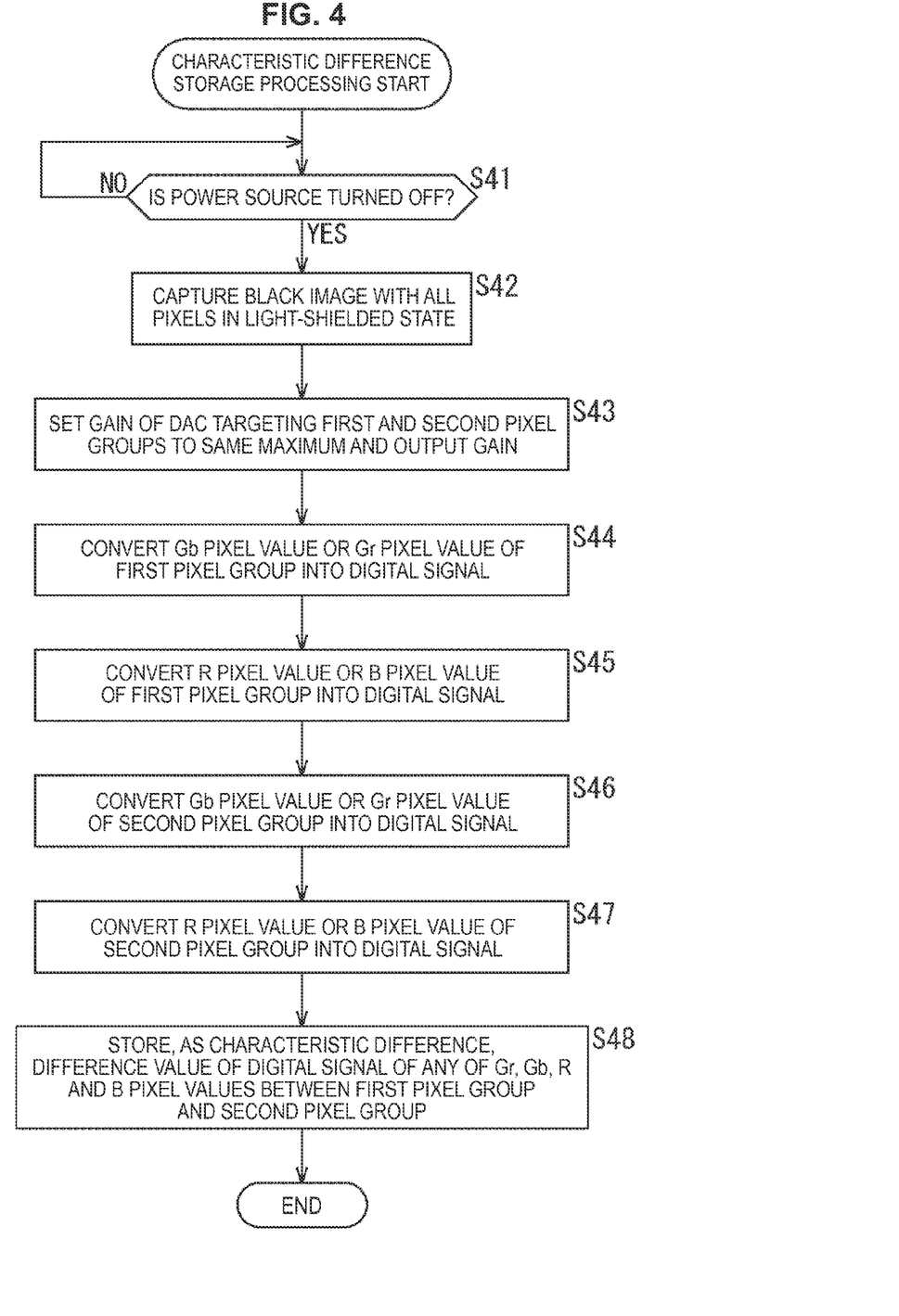
FIG. 4 is a flowchart explaining characteristic difference storage processing.

Next, characteristic difference storage processing will be described with reference to a flowchart of FIG. 4.

In Step S41, a not-illustrated control unit which controls an operation of the pixel region 10 determines whether or not an operation in which a power source of an image sensor is turned off is made, and the same processing will be repeated until it is determined that the power source has been turned off. Then, in Step S41, when it is considered that the power source has been turned off, processing progresses to Step S42.

In Step S42, as for the pixel region 10a, a black image is captured in a state where the whole region is light-shielded. That is, all the pixels are made to be light-shielding pixels, and thereby it becomes possible to carry out processing as a light-shielding pixel even in a state where any pixel is being read.

In Step S43, the characteristic difference storage unit 14 sets a gain of DACs 13-1 and 13-2 to the maximum, and supplies a reference voltage (reference) to ADCs 11-1 to 11-4.

In Step S44, ADC 11-1 converts a pixel value (Gb pixel value) of the Gb pixel of the first pixel group or a pixel value (Gr pixel value) of the Gr pixel of the first pixel group into a digital signal, and outputs it to the clamp operation unit 12, the characteristic difference storage unit 14 and the parallel serial conversion unit 15.

In Step S45, ADC 11-2 converts a pixel value (R pixel value) of the R pixel of the first pixel group or a pixel value (B pixel value) of the B pixel of the first pixel group into a digital signal, and outputs it to the clamp operation unit 12, the characteristic difference storage unit 14 and the parallel serial conversion unit 15.

In Step S46, ADC 11-3 converts a pixel value (Gb pixel value) of the Gb pixel of the second pixel group or a pixel value (Gr pixel value) of the Gr pixel of the second pixel group into a digital signal, and outputs it to the clamp operation unit 12, the characteristic difference storage unit 14 and the parallel serial conversion unit 15.

In Step S47, ADC 11-4 converts a pixel value (R pixel value) of the R pixel of the second pixel group or a pixel value (B pixel value) of the B pixel of the second pixel group into a digital signal, and outputs it to the clamp operation unit 12, the characteristic difference storage unit 14 and the parallel serial conversion unit 15.

In Step S48, the characteristic difference storage unit 14 stores as a characteristic difference a difference value of a digital signal of any one of Gr, Gb, R and B pixels between the first pixel group T1 and the second pixel group T2.

By the above processing, every time a power source is turned off, an black image is captured in a state where the maximum is set, and a characteristic difference (gain component) at this time will be calculated, and in the characteristic difference correction processing, a gain of DACs 13-1 and 13-2 will be adjusted relatively so that this characteristic difference (gain component) may be canceled. As a result, since it becomes possible to realize appropriate color development, it becomes possible to guarantee an image quality over a long period of time.

Note that, in the above, an example has been described in which so that a characteristic difference between ADC groups may be absorbed, the characteristic difference storage unit 14, when setting the first pixel group as a reference, adjusts a gain of DAC 13-2 of the second pixel group (by processing of Step S22 of FIG. 3), but, a characteristic difference may be absorbed by adjusting gains of both DACs 13-1 and 13-2.

In addition, in the above, an example has been described in which in measuring a characteristic difference, a difference between pixel signals when a gain is set to the maximum is calculated as a characteristic difference when a black image is captured, and in the characteristic difference correction processing, a characteristic difference when a gain is set to the maximum is absorbed. However, the characteristic difference may be calculated and used in accordance with a magnitude of a gain. For example, just before a power source is turned off, a black image in which a gain becomes the maximum and a black image in which a gain becomes the minimum are captured, and from linearity of the characteristic difference calculated respectively, a characteristic difference corresponding to a gain may be stored and in the characteristic difference correction processing, the characteristic difference may be canceled by setting a gain corresponding to the characteristic difference.

2. Modification Example of First Embodiment

Modification Example 1

In the above, as illustrated in FIG. 2, an example of an image sensor has been described in which ADCs 11-2 and 11-4 are arranged in the upper part of the pixel region 10, and ADCs 11-1 and 11-3 are arranged in the lower part. However, since it becomes possible to carry out correction even if a parasitic capacitance of ADCs 11-1 to 11-4 due to a layout may change in any way, it becomes possible to enhance flexibility of design without needing to be conscious of the layout.

Figure 5:
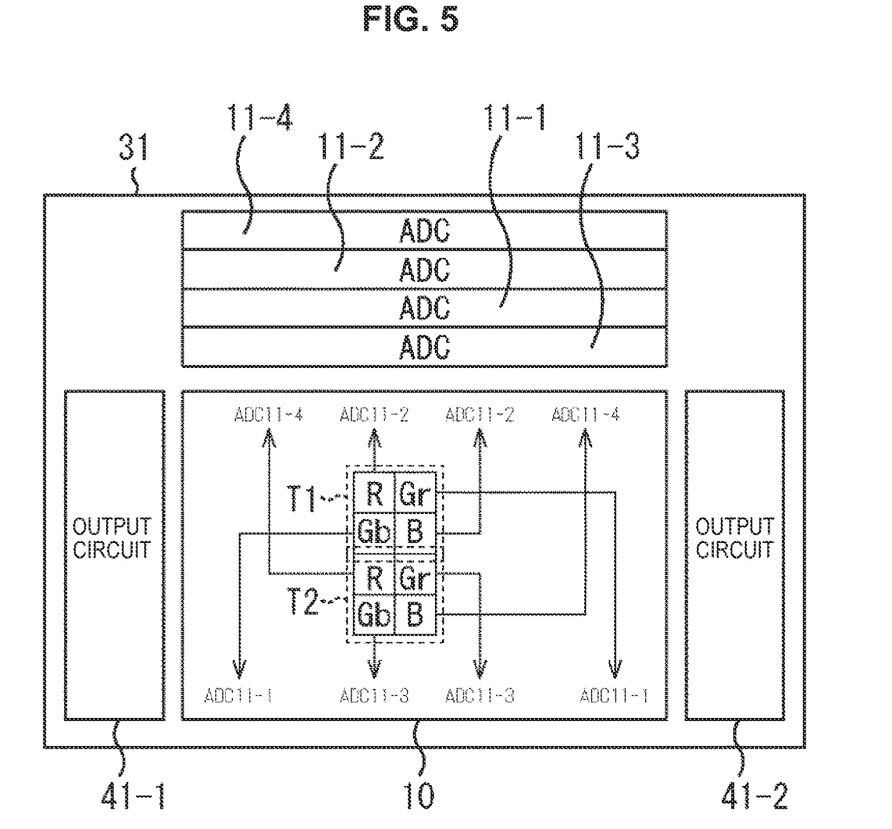
FIG. 5 is a figure explaining the pixel region of the image sensor and the layout of ADC of FIG. 1.

Therefore, for example, as illustrated in FIG. 5, ADCs 11-1 to 11-4 may be arranged in a concentrated manner in the upper part of the pixel region 10 in the figure. Note that, although not illustrated, as a matter of course, ADCs 11-1 to 11-4 may be arranged in a concentrated manner in the lower part of the pixel region 10 in the figure.

Modification Example 2

Figure 6:
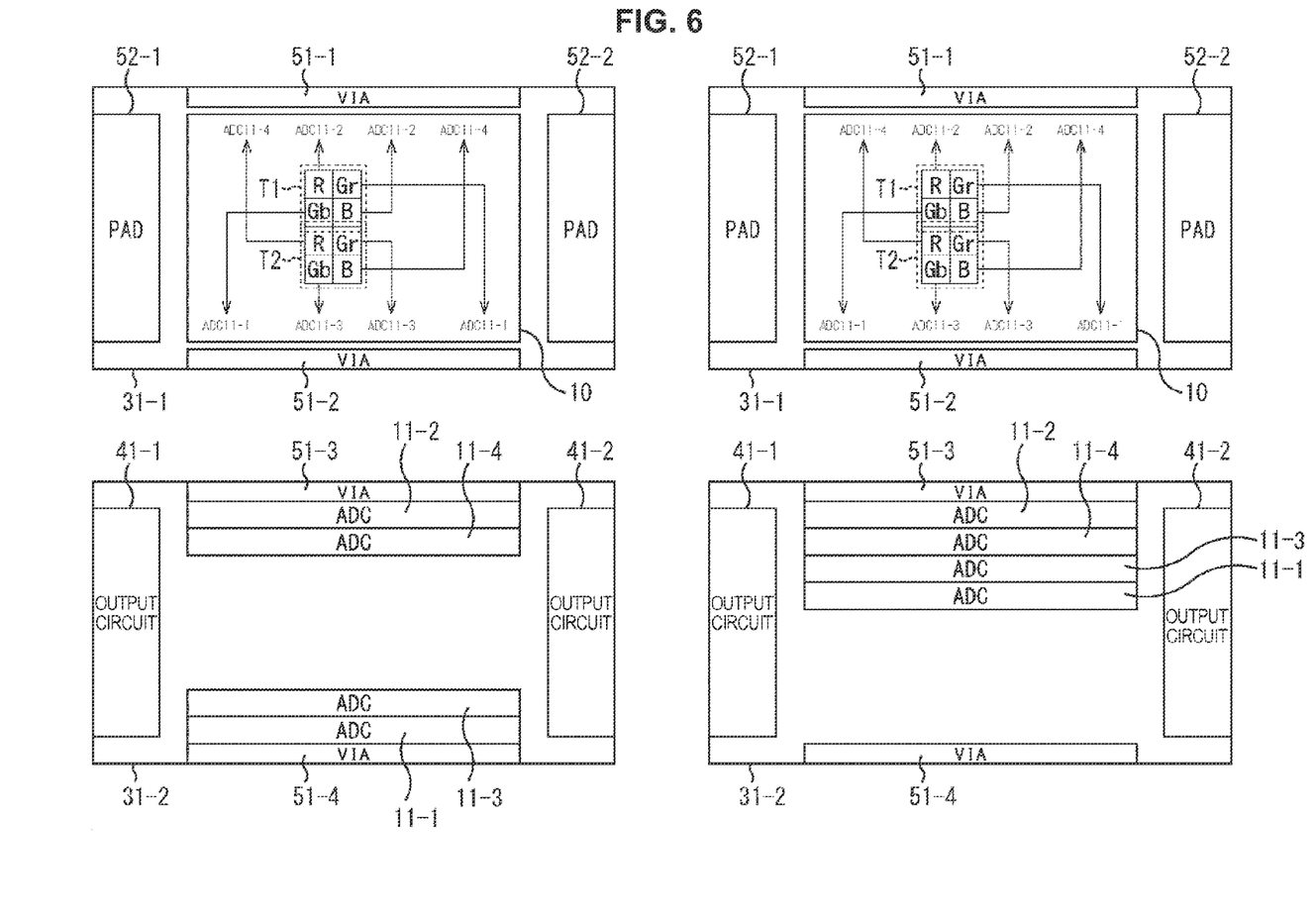
FIG. 6 is a figure explaining the pixel region of the image sensor and the layout of ADC of FIG. 1.

In addition, as illustrated in FIG. 6, an image sensor may be configured by stacking different wafers. For example, as illustrated in an upper left part of FIG. 6, the pixel region 10 may be arranged in a first wafer 31-1, and as illustrated in a lower left part of FIG. 6, ADCs 11-2 and 11-4 may be arranged in the upper part of the pixel region 10 in the figure of a second wafer 31-2, and ADCs 11-1 and 11-3 may be arranged in the lower part.

Note that, in a left part of FIG. 6, the upper part illustrates the first wafer 31-1, and the lower part illustrates the second wafer 31-2. On the first wafer 31-1, electrodes (PAD) 52-1 and 52-2 are provided. In addition, between the first wafer 31-1 and the second wafer 31-2, through electrodes (VIA) 51-1 and 51-2 are electrically connected with through electrodes 51-3 and 51-4, respectively. Therefore, each pixel signal of the pixel region 10 is supplied to ADCs 11-1 to 11-4 via through electrodes 51-1 to 51-4, and is output from the output circuits 41-1 and 41-2.

Modification Example 3

In addition, similarly, for example, as illustrated in an upper right part of FIG. 6, the pixel region 10 may be arranged in the first wafer 31-1, and as illustrated in a lower right part of FIG. 6, ADCs 11-1 to 11-4 may be arranged in the upper part in the figure of the second wafer 31-2 in a concentrated manner. Note that, as a matter of course, ADCs 11-1 to 11-4 may be arranged in the lower part of the second wafer 31-2 in a concentrated manner.

3. Second Embodiment

Configuration Example when Eight ADCs are Used

Figure 7:
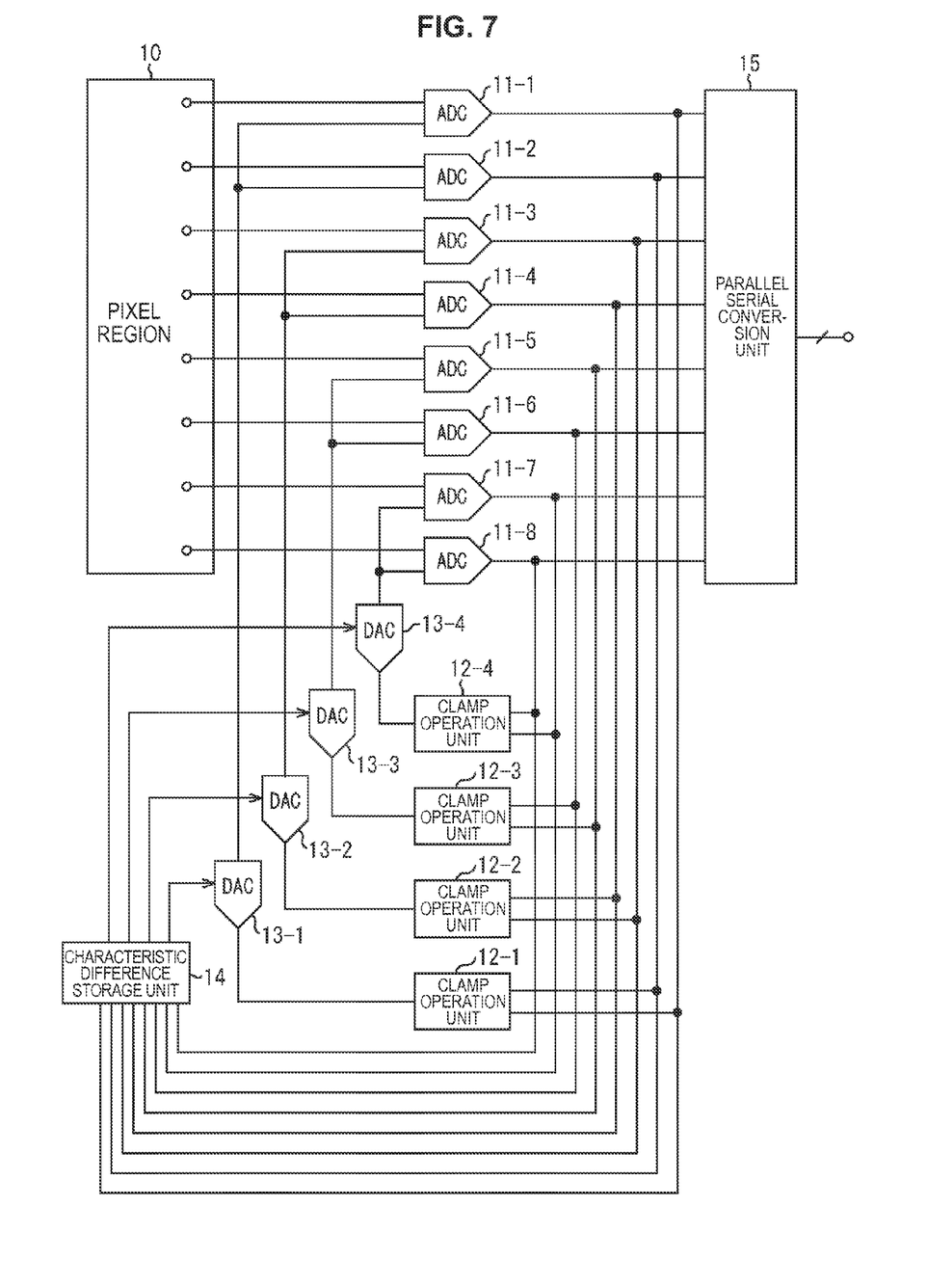
FIG. 7 illustrates an electrical configuration illustrating a configuration example of a second embodiment of the image sensor to which the present technology is applied.

In the above, although an example in which the number of ADCs 11 is four has been described, as long as a configuration in which a characteristic difference between ADC groups is adjusted is adopted, the number of ADCs 11 may be four or more. For example, as illustrated in FIG. 7, the number of ADCs 11 may be eight of ADCs 11-1 to 11-8.

In this case, the number of the clamp operation units 12 is four of the clamp operation units 12-1 to 12-4, and similarly, the number of DACs 13 also may be four of DACs 13-1 to 13-4. In this case, as illustrated in a left part of FIG. 8, the pixel group including four pixels of Gr, Gb, R and B of Bayer array in the pixel region 10 will become four pixel groups of a first pixel group T1 to a fourth pixel group T4.

Therefore, the ADC groups will be four ADC groups of ADCs 11-1 and 11-2, ADCs 11-3 and 11-4, ADCs 11-5 and 11-6, and ADCs 11-7 and 11-8. Therefore, the characteristic difference storage unit 14 stores a characteristic difference of the gain component for each of four ADC groups. Then, the characteristic difference storage unit 14 makes any one of pixel groups a reference pixel group, and makes an output value of the ADC 11 of the reference pixel group a reference, and stores a difference between the output value and an output value of the other pixel groups as a characteristic difference. In addition, for DACs 13 of pixel groups other than the reference pixel group, a gain is set so as to absorb a characteristic difference between the reference pixel group and the pixel groups other than the reference pixel group, and a reference voltage (reference) is output to each ADC 11. By the processing like this, it becomes possible to speed up image processing by increasing the number of ADCs 11, and to realize appropriate color development by absorbing a characteristic difference between ADC groups.

4. Modification Example of Second Embodiment

Modification Example 5

Figure 8:
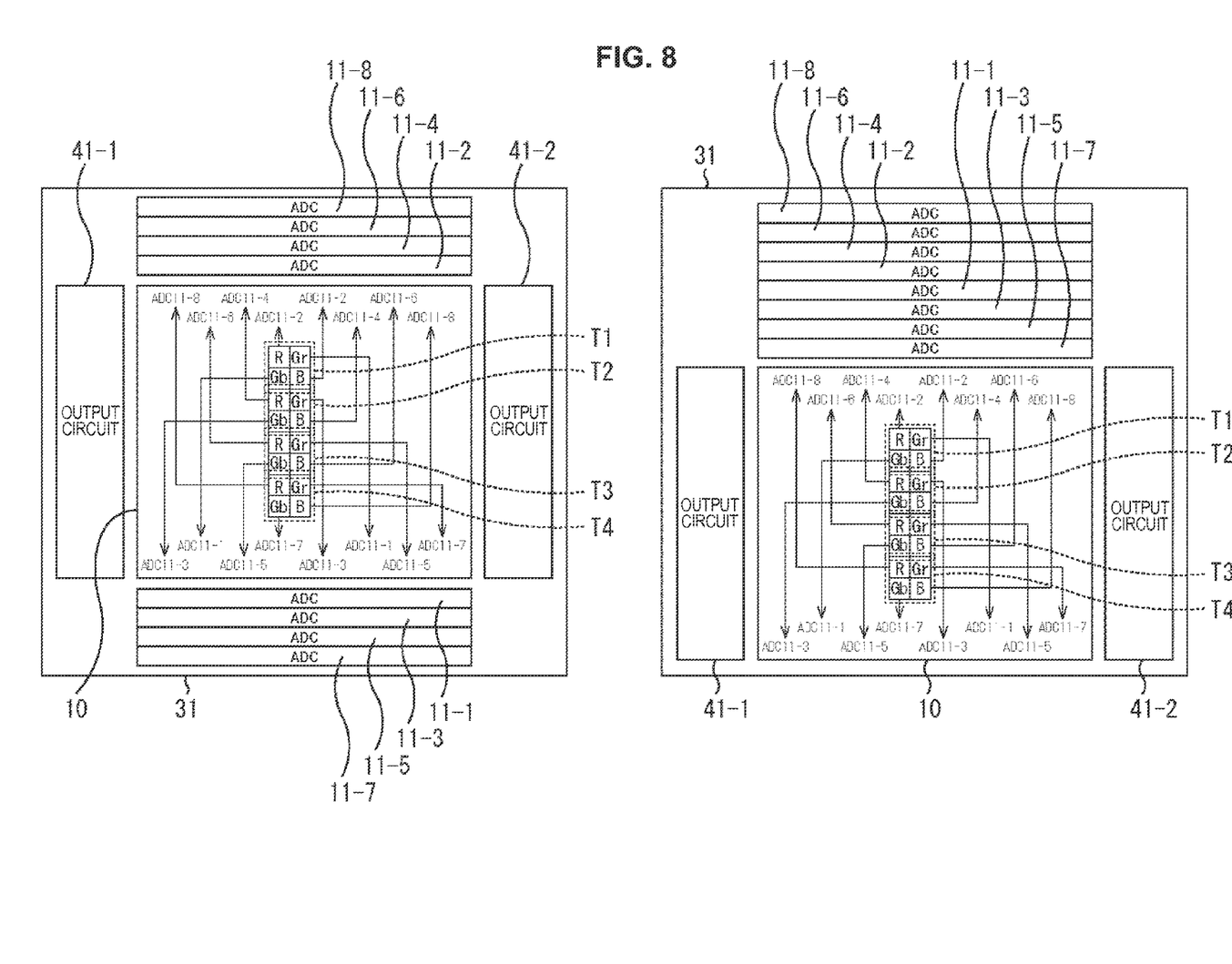
FIG. 8 is a figure explaining a pixel region of the image sensor and a layout of ADC of FIG. 7.

In the above, an example has been described in which in a case of using eight ADCs of ADCs 11-1 to 11-8, ADCs 11-2, 11-4, 11-6 and 11-8 are arranged in the upper part of the pixel region 10, and ADCs 11-1, 11-3, 11-5 and 11-7 are arranged in the lower part, but, ADCs 11-1 to 11-8 may be arranged in the upper part of the pixel region 10 in a concentrated manner as illustrated in the right part of FIG. 8. Note that, as a matter of course, ADCs 11-1 to 11-8 may be arranged in the lower part of the pixel region 10 in a concentrated manner.

Modification Example 6

Figure 9:
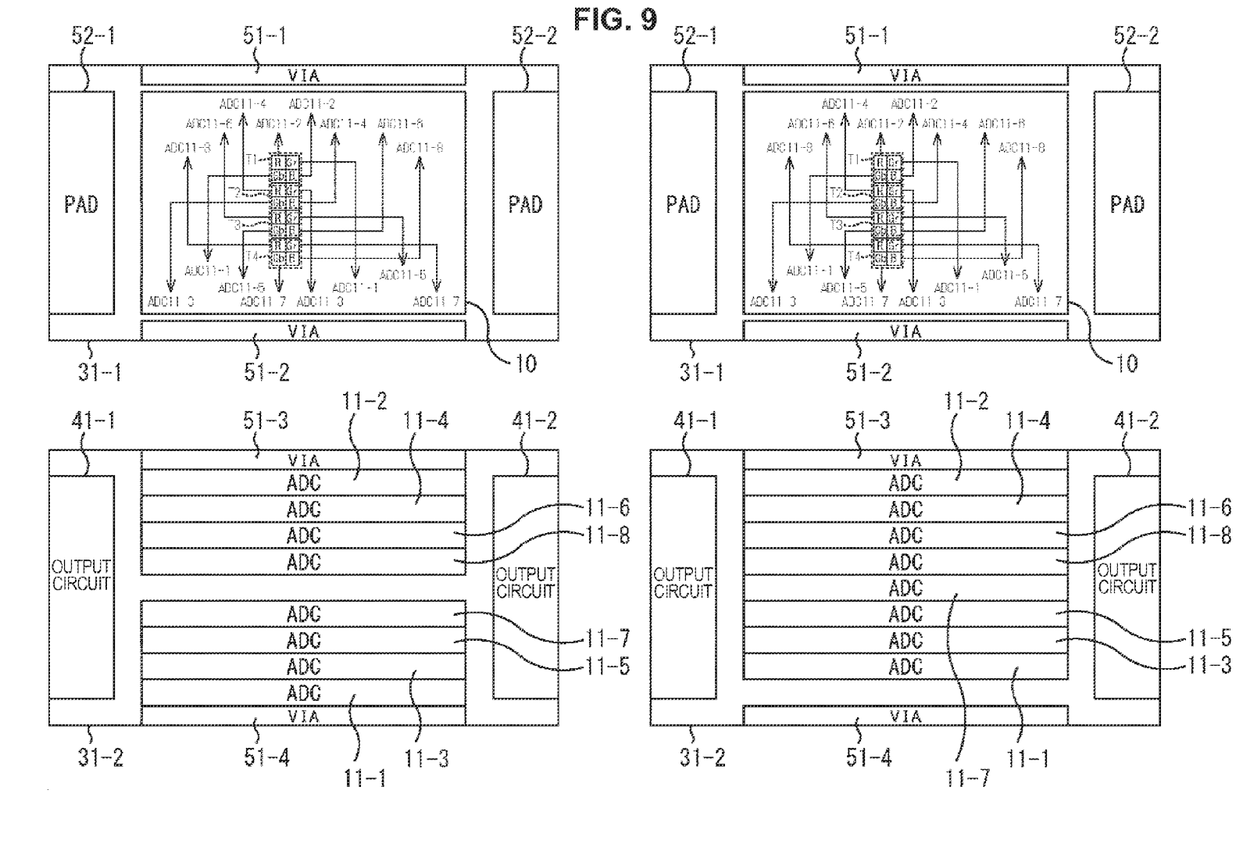
FIG. 9 is a figure explaining the pixel region of the image sensor and the layout of ADC of FIG. 7.

Example where Pixel Region and Eight ADCs are Constituted on Different Wafers In addition, as illustrated in the left part of FIG. 9, even when the number of ADCs 11-1 to 11-8 is eight, ADCs 11-1 to 11-8 may be provided on the wafer 31-2 which is different from the wafer 31-1 on which the pixel region 10 is provided. In the left part of FIG. 9, an example is illustrated in which ADCs 11-2, 11-4, 11-6 and 11-8 are arranged in the upper part of the wafer 31-2, and ADCs 11-1, 11-3, 11-5 and 11-7 are arranged in the lower part.

Modification Example 7

In addition, as illustrated in the right part of FIG. 9, in a case where the number of ADCs 11-1 to 11-8 is eight, when ADCs 11-1 to 11-8 are provided on the wafer 31-2 which is different from the wafer 31-1 on which the pixel region 10 is provided, ADCs 11-1 to 11-8 may be arranged in the upper part of the wafer 31-2 in a concentrated manner. Note that, as a matter of course, ADCs 11-1 to 11-8 may be arranged in the lower part of the wafer 31-2 in a concentrated manner.

Note that, in the above, although an example has been described in which a case of two ADCs 11 is considered to be one group, ADCs 11 of the number other than this may be considered as one group. In addition, in the above, although a case where the number of the pixel groups is two or four has been described, the number of the pixel groups may be no less than this.

An embodiment of the disclosure is not limited to the embodiments described above, and various changes and modifications may be made without departing from the scope of the disclosure.

Further, each step described by the above-mentioned flowcharts can be executed by one apparatus or by allocating a plurality of apparatuses.

In addition, in the case where a plurality of processes is included in one step, the plurality of processes included in this one step can be executed by one apparatus or by sharing a plurality of apparatuses.

Additionally, the present technology may also be configured as below.

(1) An image sensor having a column ADC configuration including, for every pixel row, an analog digital converter (ADC) that converts a pixel signal including an analog signal generated by photoelectric conversion into an output signal including a digital signal, the image sensor including:

a plurality of clamp operation units each configured to calculate a reference level based on each output signal of a plurality of ADC groups; and a reference voltage output unit configured to convert a digital signal of the reference level calculated by the clamp operation unit into a reference voltage including an analog signal, and supply the reference voltage to each the ADC that constitutes the ADC group.

(2) The image sensor according to (1), wherein the clamp operation unit calculates the reference level when each output signal of the plurality of ADC groups is an output signal of a light-shielding pixel, and wherein the reference voltage output unit converts a digital signal of a reference level calculated by the clamp operation unit into a reference voltage including an analog signal, and supplies the reference voltage to each the ADC that constitutes the ADC group.

(3) The image sensor according to (1) or (2), wherein the clamp operation unit calculates as an offset a difference between each output signal of the plurality of the ADC groups and an output signal which should be the reference level, and calculates a reference level in accordance with the offset.

(4) The image sensor according to any one of (1) to (3), further including:

a characteristic difference measurement storage unit configured to measure and store a difference of an output signal for each of the plurality of ADC groups as a characteristic difference, wherein the reference voltage output unit outputs a reference voltage to the ADC with a gain for correcting the characteristic difference that is stored by the characteristic difference measurement storage unit.

(5) The image sensor according to (4),
wherein the characteristic difference measurement storage unit measures as a characteristic difference a difference in an output signal between the plurality of ADC groups at the time of supplying the reference voltage to all of the ADC groups with a prescribed gain.

(6) An operation method of an image sensor having a column ADC configuration including, for every pixel row, an analog digital converter (ADC) that converts a pixel signal including an analog signal generated by photoelectric conversion into an output signal including a digital signal, the operation method including:
calculating a reference level based on each output signal of a plurality of ADC groups; and
converting a digital signal of the calculated reference level into a reference voltage including an analog signal, and supplying the reference voltage to each the ADC that constitutes the ADC group.

(7) An imaging device that includes an image sensor having a column ADC configuration including, for every pixel row, an analog digital converter (ADC) that converts a pixel signal including an analog signal generated by photoelectric conversion into an output signal including a digital signal, the imaging device including:
a plurality of clamp operation units each configured to calculate a reference level based on each output signal of a plurality of ADC groups; and
a reference voltage output unit configured to convert a digital signal of the reference level calculated by the clamp operation unit into a reference voltage including an analog signal, and supplies the reference voltage to each the ADC that constitutes the ADC group.

(8) An imaging method of an imaging device that includes an image sensor having a column ADC configuration including, for every pixel row, an analog digital converter (ADC) that converts a pixel signal including an analog signal generated by photoelectric conversion into an output signal including a digital signal, the imaging method including:
calculating a reference level based on each output signal of a plurality of ADC groups; and
converting a digital signal of the calculated reference level into a reference voltage including an analog signal, and supplying the reference voltage to each the ADC that constitutes the ADC group.

(9) An electronic apparatus that includes an image sensor having a column ADC configuration including, for every pixel row, an analog digital converter (ADC) that converts a pixel signal including an analog signal generated by photoelectric conversion into an output signal including a digital signal, the electronic apparatus including:
a plurality of clamp operation units each configured to calculate a reference level based on each output signal of a plurality of ADC groups; and
a reference voltage output unit configured to convert a digital signal of the reference level calculated by the clamp operation unit into a reference voltage including an analog signal, and supplies the reference voltage to each the ADC that constitutes the ADC group.

What is claimed is:

1. An image sensor having a column ADC configuration including, for every pixel row, an analog digital converter (ADC) that converts a pixel signal including an analog signal generated by photoelectric conversion into an output signal including a digital signal, the image sensor comprising:
a plurality of clamp operation units, wherein each clamp operation unit is configured to calculate a reference level for a corresponding ADC group included in a plurality of ADC groups based on an output signal of the corresponding ADC group;
a reference voltage output unit configured to convert a digital signal of the reference level calculated by each of the clamp operation units into a corresponding reference voltage, wherein for each ADC group the corresponding reference voltage is supplied as an analog signal to each ADC that constitutes the ADC group; and
a characteristic difference measurement storage unit configured to measure and store a difference of an output signal from each of the plurality of ADC groups as a characteristic difference, wherein the output signal from any one of the ADC groups is provided to the clamp operation unit corresponding to the ADC group and to the characteristic difference measurement storage unit in parallel.

2. The image sensor according to claim 1,
wherein each clamp operation unit calculates the reference level for the corresponding ADC group when the output signal of the corresponding ADC group is an output signal of a light-shielding pixel.

3. The image sensor according to claim 1,
wherein the clamp operation unit calculates as an offset a difference between each output signal of the plurality of the ADC groups and an output signal which should be the reference level, and calculates a reference level in accordance with the offset.

4. The image sensor according to claim 1,
wherein the reference voltage output unit outputs a reference voltage to the ADC with a gain for correcting the characteristic difference that is stored by the characteristic difference measurement storage unit.

5. The image sensor according to claim 4,
wherein the characteristic difference measurement storage unit measures as a characteristic difference a difference in an output signal between the plurality of ADC groups at the time of supplying the reference voltage to all of the ADC groups with a prescribed gain.

6. The image sensor according to claim 1, wherein each ADC group includes a plurality of ADCs.

7. An operation method of an image sensor having a column ADC configuration including, for every pixel row, an analog digital converter (ADC) that converts a pixel signal including an analog signal generated by photoelectric conversion into an output signal including a digital signal, the operation method comprising:
calculating by each of a plurality of clamp operation units a reference level for each ADC group included in a plurality of ADC groups based on an output signal of a corresponding ADC group;
converting a digital signal of the calculated reference level into a reference voltage;
supplying the reference voltage as an analog signal to each ADC that constitutes the corresponding ADC group;
measuring and storing a difference of an output signal from each of the plurality of ADC groups as a characteristic difference by a characteristic difference measurement storage unit; and providing an output signal from any one of the ADC groups to the clamp operation unit corresponding to the ADC group and to the characteristic difference measurement storage unit in parallel.

8. An imaging device that includes an image sensor having a column ADC configuration including, for every pixel row, an analog digital converter (ADC) that converts a pixel signal including an analog signal generated by photoelectric conversion into an output signal including a digital signal, the imaging device comprising:
   a plurality of clamp operation units, wherein each clamp operation unit is configured to calculate a reference level for a corresponding ADC group included in a plurality of ADC groups based on an output signal of the corresponding ADC group;
   a reference voltage output unit configured to convert a digital signal of the reference level calculated by each of the clamp operation units into a corresponding reference voltage, wherein for each ADC group the corresponding reference voltage is supplied as an analog signal to each ADC that constitutes the ADC group; and
   a characteristic difference measurement storage unit configured to measure and store a difference of an output signal from each of the plurality of ADC groups as a characteristic difference, wherein the output signal from any one of the ADC groups is provided to the clamp operation unit corresponding to the ADC group and to the characteristic difference measurement storage unit in parallel.

9. An imaging method of an imaging device that includes an image sensor having a column ADC configuration including, for every pixel row, an analog digital converter (ADC) that converts a pixel signal including an analog signal generated by photoelectric conversion into an output signal including a digital signal, the imaging method comprising:
   calculating by each of a plurality of clamp operation units a reference level for each ADC group included in a plurality of ADC groups based on an output signal of the corresponding ADC group;
   converting a digital signal of the calculated reference level for each of the ADC groups into a reference voltage;
   supplying the reference voltage as an analog signal to each ADC that constitutes the ADC group;
   measuring and storing a difference of an output signal from each of the plurality of ADC groups as a characteristic difference by a characteristic difference measurement storage unit; and
   providing an output signal from any one of the ADC groups to the clamp operation unit corresponding to the ADC group and to the characteristic difference measurement storage unit in parallel.

10. An electronic apparatus that includes an image sensor having a column ADC configuration including, for every pixel row, an analog digital converter (ADC) that converts a pixel signal including an analog signal generated by photoelectric conversion into an output signal including a digital signal, the electronic apparatus comprising:
   a plurality of clamp operation units, wherein each clamp operation unit is configured to calculate a reference level for a corresponding ADC group included in a plurality of ADC groups based on an output signal of the corresponding ADC group;
   a reference voltage output unit configured to convert a digital signal of the reference level calculated by each of the clamp operation units into a corresponding reference voltage, and wherein for each ADC group the corresponding reference voltage is supplied as an analog signal to each ADC that constitutes the ADC group; and
   a characteristic difference measurement storage unit configured to measure and store a difference of an output signal from each of the plurality of ADC groups as a characteristic difference, wherein the output signal from any one of the ADC groups is provided to the clamp operation unit corresponding to the ADC group and to the characteristic difference measurement storage unit in parallel.

* * * * *